United States Patent [19]

Hall, Jr. et al.

[11] 4,397,803

[45] Aug. 9, 1983

[54] METHOD OF MAKING A PHOTOFLASH DEVICE HAVING A RADIANT ENERGY-ACTIVATED DISCONNECT SWITCH AS PART OF THE CIRCUITRY THEREOF

[75] Inventors: Harold H. Hall, Jr., Marblehead; Andre C. Bouchard, Peabody, both of Mass.

[73] Assignee: GTE Products Corporation, Stamford, Conn.

[21] Appl. No.: 337,346

[22] Filed: Jan. 6, 1982

[51] Int. Cl.³ ............................................... B29C 6/00
[52] U.S. Cl. ........................... 264/272.15; 264/272.14; 264/272.16; 264/272.17; 362/13; 445/22
[58] Field of Search ............ 264/272.11, 272.14, 264/272.15, 272.16, 272.17, 272.18, 275; 29/25.13, 841; 362/11, 13, 14, 15; 445/22, 28

[56] References Cited

U.S. PATENT DOCUMENTS

| | | | |
|---|---|---|---|
| 3,120,573 | 2/1964 | Gingrande et al. | 264/272.11 |
| 3,315,071 | 4/1967 | Pfefferle | 362/11 |
| 3,612,850 | 10/1971 | Nijland et al. | 240/13 |
| 4,017,728 | 4/1977 | Audesse et al. | 240/13 |
| 4,154,569 | 5/1979 | van Werkhoven | 362/15 |
| 4,186,424 | 1/1980 | Fohl | 362/13 |
| 4,200,901 | 4/1980 | Shaffer et al. | 362/5 |
| 4,227,240 | 10/1980 | Shaffer et al. | 362/13 |
| 4,243,371 | 1/1981 | Kewley et al. | 362/11 |
| 4,249,230 | 2/1981 | Colville et al. | 362/13 |
| 4,268,891 | 5/1981 | Brower et al. | 362/11 |
| 4,282,559 | 8/1981 | Audesse et al. | 362/15 |
| 4,320,440 | 3/1982 | Brower et al. | 362/13 |

FOREIGN PATENT DOCUMENTS 2039936 8/1980 United Kingdom .

Primary Examiner—James B. Lowe
Attorney, Agent, or Firm—Lawrence R. Fraley

[57] ABSTRACT

A method of making a photoflash device wherein the device includes a plastic substrate, lamp-firing circuitry located on a first surface of the substrate, a Mylar disconnect switch also secured to the first surface of the substrate and electrically joined to the lamp-firing circuitry, at least one electrically activated photoflash lamp located above the Mylar switch for activating said switch upon ignition thereof, and a solid, light-transmitting polymer located about and encapsulating the glass envelope of the lamp. A thin, light-transmitting polyester member is located over the Mylar switch prior to pouring of the liquid casting resin which eventually forms the solid polymer protective encapsulant. The polyester member serves to prevent contact between the resin and switch and thus enables close placement of the lamp's envelope and switch, said placement thereby assuring proper activation (e.g., severance) of the switch.

8 Claims, 5 Drawing Figures

METHOD OF MAKING A PHOTOFLASH DEVICE HAVING A RADIANT ENERGY-ACTIVATED DISCONNECT SWITCH AS PART OF THE CIRCUITRY THEREOF

DESCRIPTION

1. Cross Reference to Copending Applications

In an application filed Oct. 5, 1981 under Ser. No. 308,636 (entitled "Method of Encapsulating a Photoflash Lamp Using a Powdered Resin," inventors A. C. Bouchard et al.), there is described a method of providing a protective coating on the glass envelope of a photoflash lamp using a thermoplastic or thermosetting resin powder. The powder is liquified by application of heat and pressure, the result being a solid polymer member having the envelope encased therein.

In an application filed Oct. 5, 1981 under Ser. No. 308,637 (entitled "Method of Making a Photoflash Article Using Injection Molding," inventors A. C. Bouchard et al.), there is described a method of making a photoflash article wherein the article's substrate is formed initially by injecting molding, said formed substrate defining therein an individual open-ended compartment for each lamp. With the lamp then oriented in the compartment, a quantity of a polyester resin in liquid form is then poured into the compartment to surround the entire exterior surface of the lamp's glass envelope. In a second embodiment, a quantity of a thermoplastic or thermosetting resin is injected, rather than the liquid polyester, to define the finished polymer, said previously injection molded substrate located within an injection molding apparatus during this step.

In an application filed Oct. 5, 1981 under Ser. No. 308,698 (entitled "Method of Encapsulating Photoflash Lamps," inventors A. C. Bouchard et al.), there is described a method of providing a protective coating on a photoflash lamp, said method involving placing the lamp in a mold member and thereafter pouring a quantity of a liquid casting resin into the mold to surround and encase the lamp's glass envelope. The resin is then allowed to cure, the result being a solid polymer member having the lamp securedly retained therein.

2. Technical Field

This invention relates to photoflash devices and particularly to such devices which are electrically activated. Even more particularly, the invention relates to photoflash devices and methods of producing same wherein the finished product's electrical circuitry contains radiant energy-activated disconnect switches.

BACKGROUND

In the above-identified applications, there are described several different techniques for forming a protective covering on the exterior surface of a photoflash lamp for eventual use in photoflash device. Such devices, and particularly those defined above, include several (e.g., 4, 6, 8 or 10) such lamps as part thereof, along with various additional components such as circuitry (for those which are electrically activated), reflectors, switches, etc. Examples are shown and described in U.S. Pat. No. 4,268,891 (B. G. Brower et al.), U.S. Pat. No. 4,249,230 (W. T. Colville et al.), U.S. Pat. No. 4,200,901 (J. W. Shaffer et al.), and U.S. Pat. No. 4,186,424 (T. Fohl). All of these patents are assigned to the assignee of the instant invention.

With particular regard to multilamp photoflash devices which are electrically activated (e.g., by the power source typically found in many of today's cameras when the device is inserted in a socket typically found on such cameras), such devices typically require a sequencing circuit to assure sequential ignition of each lamp therein in response to receipt of a high voltage pulse provided by the aforementioned camera power source (e.g., a piezoelectric element). To assure this sequential ignition, the circuitry includes various switching components, a preferred example being the radiant energy-activated disconnect switch defined in U.S. Pat. No. 4,017,728 (E. G. Audesse et al.), said patent also assigned to the assignee of this invention. As defined therein, this member is readily capable of being severed (disconnecting) to provide an open circuit thereacross upon receipt of radiant energy in the form of light and/or heat from a nearby photoflash lamp when said lamp is fired (ignited). The subsequent manner of operation of the circuit is described fully in U.S. Pat. No. 4,017,728 and is now well established in the art, further definition thereof not believed necessary.

There are described in copending applications under Ser. Nos. 183,915 and 262,008 subminiature photoflash devices which employ several (e.g., 10) subminiature photoflash lamps. As defined therein, the completed devices preferably include switching means so as to assure sequential lamp ignition. The chosen means suggested in Ser. No. 183,915 is to orient the lamp-firing circuitry and switch components (preferably those of the variety described in U.S. Pat. No. 4,017,728 above) on an external surface of the device's substrate member and provide contact thereto between the lamps and switches by forcing the lamp lead-in wires through the substrate, said wires penetrating the circuit paths at preestablished locations. Understandably, the mode of connection necessitates placement of the disconnect switch on the same side of the substrate as the circuitry, thus locating these components at an undesirable spaced (the substrate thickness) location from the activating lamps. This position relationship was believed necessary in Ser. No. 183,915 when using the described cover means and particularly when using an encapsulating-type material to encase the lamp. In the device described in Ser. No. 262,008, it is taught to place the switch on the same side of the substrate as the activating photoflash lamps. However, the means for providing a cover for said lamps involves use of a hollow-type, plastic light-transmitting member of a type similar to those used in many of the aforementioned, earlier devices. Use of such a cover adds appreciably to the overall volume of the finished product and, in most instances, still necessitates provision of a separate protective covering (e.g., coating) for each lamp located therein. With particular regard to photoflash devices of the subminiature variety, such as those shown in Ser. No. 183,915 and Ser. No. 262,008, a preferred means for providing a protective covering on each lamp is to cover the lamp with a resin material capable of eventually forming a solid, light-transmitting polymer upon curing thereof. As stated, examples of providing such a covering are described in the aforementioned copending applications, particularly those under Ser. Nos. 308,637 and 308,698. Use of this type of covering assures a solid, robust finished article of smaller dimension than those requiring the aforementioned, hollow cover, while at the same time enabling proper light emission and providing positive lamp containment during ignition thereof.

In accordance with the teachings of the instant invention, there is described a method of making a photoflash device wherein the relatively delicate radiant energy-activated disconnect switch can be positioned immediately adjacent the respective photoflash lamp and thus on the same side of the device's substrate, while allowing use of a poured liquid resin (such as defined in Ser. No. 308,637 and Ser. No. 308,698) to flow about the lamp and provide a protective coating therefor. The lamp is thus able to activate the switch in a facile manner, the switch is assured of being positively connected to corresponding circuitry, and the highly advantageous polymer covering can still be utilized. Surprisingly, the liquid resin can be used without adversely affecting the operational capability of the switch member.

It is believed, therefore, that a photoflash device possessing the several features described above would constitute an advancement in the art. It is further believed that a method of making such a device would also constitute an art advancement.

DISCLOSURE OF THE INVENTION

It is a primary object of this invention to enhance the photoflash art by providing a method of making an electrically activated photoflash device wherein the finished product includes at least one radiant energy-actuated switch located on the same side of the device's substrate as the corresponding, activating photoflash lamp, said lamp being positively retained within a solid polymer material serving as a protective coating therefor.

It is another object of the invention to provide such a method which is inexpensive to practice and can be utilized to produce photoflash devices of several diverse configurations.

In accordance with one aspect of the invention, there is provided a method of making a photoflash device comprising the steps of: (a) positioning a radiant energy-activated disconnect switch on the first surface of a substrate; (b) positioning lamp-firing circuitry on the first surface, said circuitry being electrically connected to the switch; (c) locating a thin, light-transmitting member over the switch to provide a cover therefor; (d) locating at least one photoflash lamp on the substrate proximate the disconnect switch and, in one embodiment, physically engaging an upper surface of the thin, light-transmitting switch cover; and (e) pouring a liquid casting resin to cover the lamp and contact the substrate and bond thereto, said resin forming a solid, light-transmitting polymer upon curing thereof.

BEST MODE FOR CARRYING OUT THE INVENTION

For a better understanding of the present invention, together with other and further objects, advantages, and capabilities thereof, reference is made to the following disclosure and appended claims in connection with the above-described drawings.

Figure 1:
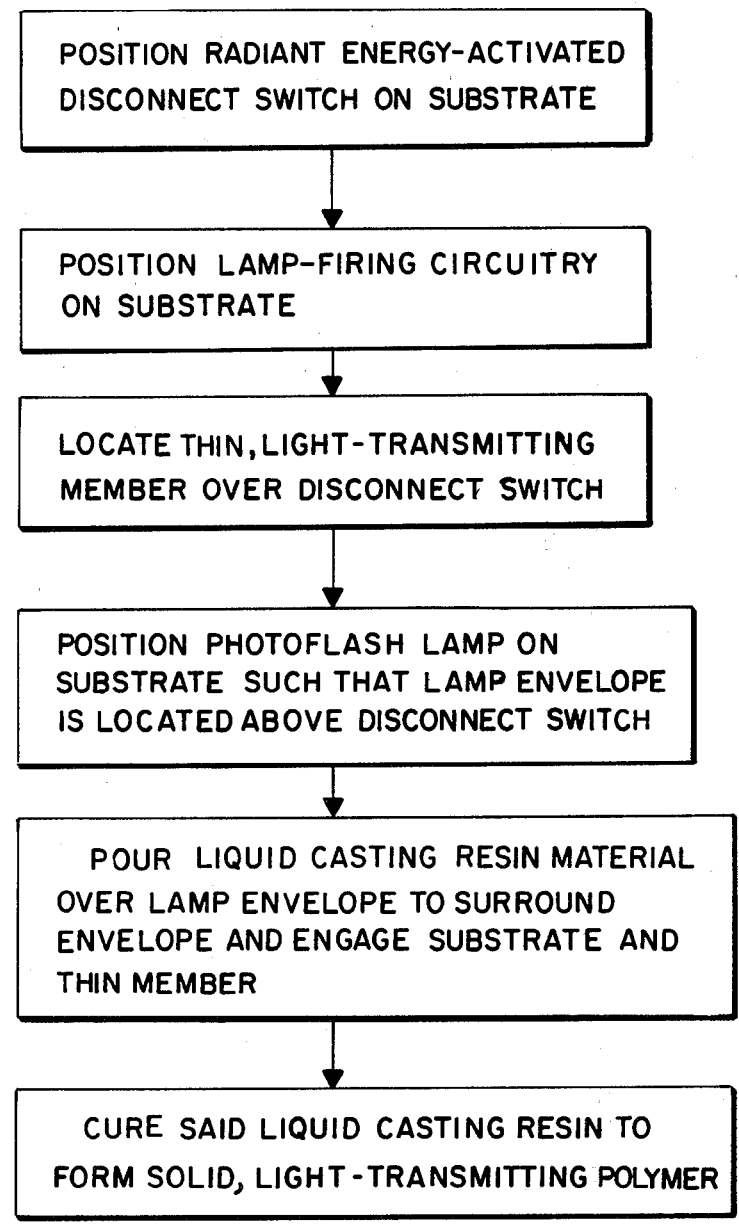
FIG. 1 is a flow diagram illustrating the various steps, not necessarily in order, of forming a photoflash device in accordance with the teachings of this invention.
Figure 2:
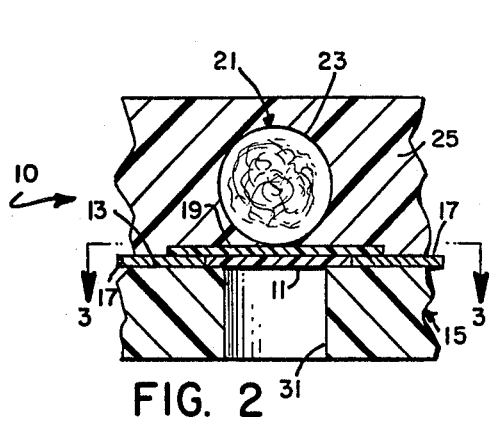
FIG. 2 is a partial side elevational view, in section, of a photoflash device as formed by the method shown in FIG. 1.

With particular reference to FIG. 1, there is shown a flow diagram depicting the various steps to produce a photoflash device 10 as illustrated in FIG. 2. In summary, this method comprises the steps of positioning a radiant energy-activating disconnect switch 11 on the first surface 13 of an electrically insulative substrate 15, electrically connecting two opposing ends of the disconnect switch to lamp-firing circuitry 17, positioning over the disconnect switch 11, a thin, light-transmitting member 19 so as to cover switch 11, orienting a photoflash lamp 21 having a glass envelope 23 above the switch 11 and light-transmitting member 19 such that the glass envelope is positioned immediately adjacent and above switch 11 (and therefore capable of activating the switch in a manner established in the art), and pouring a quantity of a liquid casting resin material over the lamp envelope 23 such that the material, when cured, surrounds and engages the envelope to provide a solid, light-transmitting polymer member 25 to positively encase the envelope and prevent escapement of glass particles in the event the lamp 21 should explode upon ignition thereof. Although it is shown in the drawings to only use a single lamp 21 and corresponding switch 11, it is understandably within the scope of the invention to provide a photoflash device 10 having several of these components as part thereof.

The finished product, as described below, is of the subminiature variety; that is, it utilizes photoflash lamps 21 having an extremely small glass envelope 23. By way of specific example, envelope 23 possesses an external diameter of only approximately 0.165 inch and a length of slightly less than 0.500 inch. By way of further example, the rectangular multilamp devices as described in the aforementioned filed applications under Ser. No. 183,915 and 262,008 each possessed a width of about 1.00 inch, a height of about 1.25 inch, and a thickness of only about 0.500 inch. It is understood, however, that the teachings of the invention are also applicable to the production of photoflash devices wherein substantially larger components are utilized.

Photoflash lamp 21 is of the electrically-activated variety and thus includes a pair of two lead-in wires 27 which project from one end of envelope 23. Application of a suitable high voltage pulse across wires 27 (such as is provided from the power source, e.g., a piezoelectric element, typically associated with many of today's cameras) results in ignition of lamp 21, said lamp producing a high-intensity flash of light sufficient to illuminate a subject being photographed. Envelope 23, as stated, is of glass and may be of any glass material recognized in the photoflash art, typical examples including softglass (e.g., soda lime, lead), as well as the more recently introduced hardglasses (e.g., borosilicate). Furthermore, although lamp 21 is described as being electrically activated, it is also within the scope of the invention to utilize lamps of the percussively-actuated variety as are well known in the art. Such lamps typically include a metallic primer member of tubular configuration which projects fom one end of the lamp's glass envelope and includes therein a primer material. Deformation of the tubular member results in deflagration of the primer material therein upwardly into the glass envelope to ignite the shredded combustible located therein and produce the desired high intensity flash. Electrically activated lamps are preferably used in the invention, however, to accommodate the greater number of cameras capable of utilizing electrical photoflash devices.

As is known in the art, photoflash lamps of the variety described include within the glass envelope a quantity of combustible, shredded material, such as zirconium or hafnium foil, and a combustion-supporting gas such as oxygen at a pressure well above one atmosphere. Typical gas pressures approach twelve atmospheres. During lamp flashing, the glass envelope is subjected to severe thermal shock as a result of hot globules of metal oxide impinging on the internal walls of the envelope. As a result, cracks or crazes occur in the glass and at high internal pressures, containment becomes extremely difficult. Understandably, it is essential to contain the glass envelope in order to protect the consumer using a device of this nature.

A most preferred means of achieving lamp containment to thus protect against glass particle escapement is described in the above applications under Ser. Nos. 308,637 and 308,698. In accordance with the teachings therein, a suitable mold (not shown) is provided to define the external configuration for the poured liquid casting resin which eventually performs the solid-polymer component about the encased glass envelope. In an alternative embodiment, the injection molded substrate includes upstanding sidewalls so as to define an open-ended compartment through which the liquid casting resin can be poured to surround the envelope. While these techniques have proven highly successful in encapsulating and thus positively retaining the glass envelope in the finished product, it was heretofore believed that positioning the desired disconnect switch immediately adjacent the lamp and therefore on the same side of the device's insulative substrate as the lamp envelope would prove impossible to accomplish because of the possibly adverse effect on this delicate switch member.

The switch as used in the present invention comprises a length of electrically conductive, heat shrinkable polymeric material which is located on first surface 13 such that its mid-portion bridges an aperture 31 previously provided within substrate 15. Switch 11 is of the type described in U.S. Pat. No. 4,017,728 (E. G. Audesse et al.), thus comprising a plastic material preferably fabricated from mono- or biaxially oriented polyethylene, polypropylene, polyestyrene, polyester or nylon. The polymeric material itself may be rendered electrically conductive by the addition of such additives of carbons or it may be rendered surface conductive by the deposition of the conductive layers of material thereon. Such conductive layers may be attained, e.g., by a vacuum metalization, electrolysis plating, printing, or coating using conductive inks, by silk screening, or by otherwise applying a conductive path across the switch defined by the polymeric film. The performance of highly reflective materials, such as aluminized polypropylene, can be enhanced by applying a coating or spot 33 of a dark, light absorbing ink or other similar material on the surface of the switch which faces the lamp. Spot 33 is shown hidden in FIG. 3. The piece of switch 11 may be self-adhesive, such as a tape, and pressure applied to attach both ends to the surface 13 as shown in FIGS. 2-4.

It has been found, surprisingly, that switch 11 can be positioned in the manner described herein and the preferred liquid casting resin material subsequently poured over lamp 23 and into the desired position without adversely affecting the operational capability of the switch. That is, it has been found, that switch 11 can be located immediately adjacent (below) the glass envelope 23 of the photoflash lamp which serves to trigger the switch with the switch still retaining the capability of successfully severing upon receipt of radiant energy in the form of light and/or heat from lamp 21. Receipt of such energy, as described in U.S. Pat. No. 4,017,728, causes the polymeric material to weaken and soften, as well as shrink. A separation thus occurs near the center of each piece, with the two severed ends shrinking away from each other so as to give an open circuit which will reliably withstand several thousand volts without leakage. The result in a circuit using this arrangement is that a lamp after flashing is removed electrically from the circuit, with any subsequent lamps being unaffected by short circuiting or residual conductivity in previously flashed lamps. Typical disconnect switches operate within about 30 milliseconds or less, therefore assuring high flash sequencing rates for multi-lamp arrays. To assure that this severance will successfully occur in the instant invention, the aforementioned light-transmitting member 19 is located over the switch 11 to provide a cover therefor and thus protect the switch against contact by the liquid resin material. The preferred light-transmitting member is comprised of a plastic material, such as polyester. The member is transparent to assure passage of light and/or heat therethrough such that the switch will be severed by lamp 21. Member 19, in one embodiment of the invention, possessed a thickness of only about 0.0005 inch while that of the covered polymeric switch 11 was 0.0015 inch. Switch 11, as described in U.S. Pat. No. 4,017,728, has a typical width of 0.060 inch and a length of 0.375 inch. Switch adherence to first surface 13 of substrate 15 is accomplished by applying at the opposing ends of switch 11 a pressure sensitive adhesive.

Figure 3:
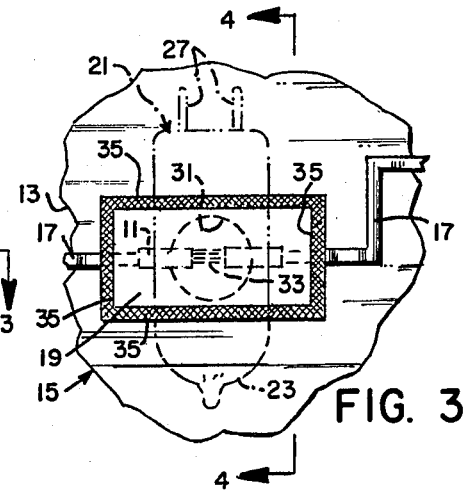
FIG. 3 is a partial top view, in section, of the photoflash device of FIG. 2 as taken along the line 3—3 in FIG. 2.
Figure 4:
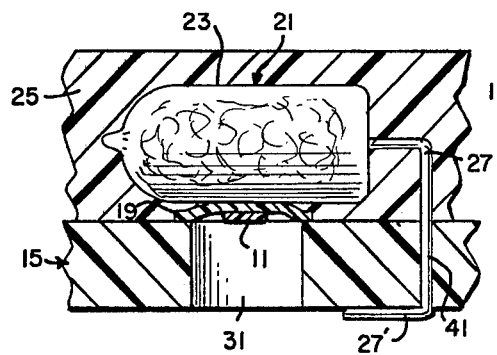
FIG. 4 is a partial front elevational view, in section, of the device of FIG. 2 as taken along the line 4—4 in FIG. 3.

As shown in FIGS. 2 and 3, the thin polyester member 19 is of rectangular configuration and is substantially larger than the corresponding switch 11 located thereunder. In one example, member 19 possessed a width of 0.100 inch and a length of 0.400 inch. Member 19 is secured to the first surface of substrate 15 using a suitable adhesive, said adhesive applied along the peripheral region 35 thereof. This region is depicted in cross section in FIG. 3. Member 19 thus also serves to cover the portions of lamp-firing circuitry 17 which are connected to the respective ends of switch 11. It is important to note that the adhesive used to secure the polyester member 19 to substrate 15 does not engage or adhere to any part of switch 11. This material, like the liquid resin which eventually forms the solid polymer member 25, could adhere to the switch and subsequently prevent severance thereof to accomplish the desired open circuit as described above. In other words, the upper surface of switch 11 which abuts the lower surface of the corresponding thin member 19 is able to move independently of said surface and is not adhered thereto in any manner. The central portion of switch 11 (that portion which deforms and separates upon switch activation) is thus able to pull away in the manner desired. It is for this reason that it is preferred to provide aperture 31 immediately below the switch's central portion as shown in FIG. 2.

As shown herein, the external surface of glass envelope 23 physically engages (rests upon) the upper surface of the thin polyester member 19. Member 19 thereby provides the additional capability of serving as a spacer component to thus define a means of precisely spacing the lamp envelope from corresponding switch 11. Member 19 also enables the envelope 23 to rest thereon during pouring of the described liquid resin material to thus assure envelope alignment during the formation process.

The resin poured about envelope 23 is preferably that described in the above copending application under Ser. No. 308,637. The casting resin as defined therein is a polyester resin having a curing agent, said material available from the Buehler Corporation, Evanston, Ill. and sold under the product name Castolite.

After this resin has been poured, it is allowed to cure until it hardens to a solid mass. Curing is achieved in one aspect of the invention by exposing the resin to a temperature within the range of about 60 to 80 degrees Farenheit for a period of between 6 and 8 hours. In one specific example, the resin was cured at a temperature of 70 degrees Farenheit for approximately 8 hours. The result was a solid, light-transmitting polymer which served the aforedescribed dual purpose of both totally encapsulating the photoflash lamp and also bonding to the polystyrene substrate 15 to provide a unitary, finished structure.

It is understood with regard to the present invention that curing of the resin could be accomplished on a more accelerated fashion than that described. That is, it is possible to expose the substrate and resin to higher temperatures for lesser periods of time. For example, subjecting these members to a temperature within the range of about 120 degrees Farenheit to about 130 degrees Farenheit allowed the resin to cure within a time period of only about 30 minutes to form the solidified mass 25.

It is understood with regard to the instant invention, however, that Castolite represents only one example of a material which can be used herein. Other materials which can be satisfactorily employed include epoxy casting resins such as Stycast 1269-A, sold by Emerson & Cumming, Inc., Canton, Mass., and "2-Ton" Clear Epoxy, sold by the Devcon Corporation, Danvers, Mass. Both of these materials have proven to exhibit high temperature properties, good color durability, and sound envelope containment, in addition to being crystal clear upon curing.

Yet another resin material suitable for use in the instant invention is an acrylate resin; that is, a resin which is provided by the polymerization of acrylic acid, methacrylic acid, or the esters of these (e.g., ethyl, butyl, and methyl esters). Polymerization may be accomplished by exposing the poured material (monomer) to ultraviolet light, or heat, or by the addition of an organic peroxide. For example, it is possible to fill the mold member to a first level (nearly to the top surface) with methyl methacrylate monomer having a minor percentage by weight benzoyl peroxide (e.g., 0.01 to 0.10 percent), and thereafter adding about 0.05 percent by weight benzoyl peroxide. Polymerizing of the monomer occurs in about 20 minutes at room temperature (about 70 degrees F). Mechanical properties can be enhanced; that is, a plasticizer (e.g., dibutyl phythalate) can be added to the monomer before completion of the polymerizing phase.

The preferred material for substrate 15 is a plastic material, e.g., polystyrene. The preferred material for lamp firing circuitry 17 can be any of those widely used in the photoflash art. Examples of such materials include aluminum and copper, with techniques for application of the circuitry including the use of silk screening and die stamping. If silk screening is used, the deposited circuit paths 17 can be applied after switch 11 has been adhered to first surface 13, said circuit paths slightly overlapping the end portions of switch 11 to assure positive connection thereto. It is thus understood that switch 11 can be secured to substrate 15 either prior to or subsequent the positioning of circuitry 17.

As described above, the liquid casting resin is prevented from physically contacting any portions of switch 11 to thus assure proper operation of the switch. It is noted, however, that the resin does physically contact the remaining portions of the first surface 13 of substrate 15, in addition to the conductive circuitry 17. As a result of said contact, the resin is bonded to the substrate 15 to provide a unitary structure once the resin has fully cured.

In FIG. 4, the positioning relationship of the invention's lead-in wires 27 (one shown) can be seen. As illustrated, each wire is inserted within a corresponding opening 41 located within substrate 15 such that an extending portion 27' of the wire protrudes beneath the lower surface of the substrate and is bent back against said surface. This form of retention serves to positively hold the envelope body in alignment during the aforedescribed pouring of the liquid resin material. Each lamp 21 is thus positively retained in a fixed relationship with regard to the switch 11 and aperture 31. This retention is in the form of a five-point form of engagement, a first of these being the situs of engagement of the external surface of envelope 23 with the substantially flat upper surface of polyester member 19, and the other four locations being provided by the two lead-in wires 27; that is, each wire includes two leg portions which engage the substrate 15 at two separate surfaces or regions in the manner shown in FIG. 4. Openings 41 are provided within substrate 15 during the forming (e.g., molding) thereof. As an alternative, these may be provided by a separate operation such as drilling. Preferably, each opening is only slightly larger than the corresponding external diameter of the lead-in wire inserted therein to assure a friction fit therebetween.

Figure 5:
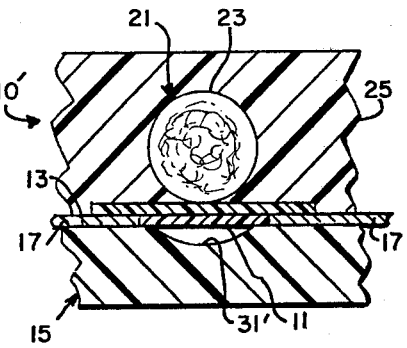
FIG. 5 is a partial side elevational view, in section, of an alternate embodiment of a photoflash device as formed using the teachings herein.

With particular regard to FIG. 5, there is shown a photoflash device 10' in accordance with an alternate embodiment of the invention. Device 10' is formed in the same manner as defined above for device 10 with the exception that instead of providing an aperture within substrate 15, a depression 31' is located within the substrate's first or upper surface 13. Depression 31' has proven to provide a suitable open region in which the severed portions of switch 11 can occupy after activation thereof.

There is thus been shown and described a method of making a photoflash device wherein it is possible to position the relatively delicate disconnect switch component of the device immediately adjacent the photoflash lamp as also employed therein. This close positioning relationship assures subsequent activation of the switch upon lamp ignition to provide the lamp sequencing operation for the invention's circuitry. The invention as described is relatively inexpensive to practice and can be readily adapted to mass production techniques. The invention as described is also particularly adaptable to formation of devices wherein several individual photoflash lamps and corresponding switching components are used. As described, these devices can be of practically any configuration desired in the art. Several devices formed in accordance with the teachings herein were tested (fired) with none exhibiting signs of fracture, glass escapement, etc.

While there have been shown and described what are at present considered the preferred embodiments of the invention, it will be obvious to those skilled in the art that various changes and modifications in addition to those described may be made therein without departing from the scope of the invention as defined by the appended claims. For example, it is readily possible to provide reflectance means as part of the photoflash devices produced herein to enhance forward light output from each of the encapsulated lamps 21. This reflectance means can be in the form of a thin layer of reflective material (e.g., vapor-deposited aluminum) which can be applied to the upper or first surface 13 of substrate 15 prior to pouring of the liquid resin material. In this regard, the polyester light-transmitting member and the lamp-firing circuitry can be masked prior to deposition of this reflecting material.

What is claimed is:

1. A method of making a photoflash device including a substrate member, lamp-firing circuitry, at least one radiant energy-activated disconnect switch, and at least one photoflash lamp for activating said disconnect switch upon ignition thereon, said lamp including a glass envelope, said method comprising:

positioning said radiant energy-activated disconnect switch on a first surface of said substrate member;

positioning said lamp-firing circuitry on said first surface of said substrate member;

electrically connecting said circuitry and said disconnect switch;

locating a thin, light-transmitting member over said disconnect switch to cover said switch;

securing said thin, light-transmitting member to said first surface of said substrate member about said switch such that said switch is able to move independently of said thin, light-transmitting member;

positioning said photoflash lamp on said substrate member such that said glass envelope is located above said disconnect switch and in contact with an upper surface of said thin, light-transmitting member, said light-transmitting member thereby providing a predetermined spacing between said lamp and said disconnect switch;

pouring a liquid casting resin material capable of forming a light-transmitting, solid polymer upon curing thereof over said glass envelope of said photoflash lamp such that said resin material flows about and substantially surrounds said envelope and engages said substrate member and said thin, light-transmitting member, said secured, light-transmitting member preventing contact between said switch and said liquid casting resin material; and thereafter curing said resin material to form said light-transmitting polymer, said polymer bonded to said glass envelope, substrate, and thin, light-transmitting member.

2. The method according to claim 1 further including the step of providing an aperture within said substrate member prior to said positioning of said disconnect switch, said switch thereafter being positioned on said substrate member so as to bridge said aperture.

3. The method according to claim 1 further including the step of providing a depression within said first surface of said substrate member prior to said positioning of said disconnect switch, said switch thereafter being positioned on said substrate member so as to bridge said depression.

4. The method according to claim 1 wherein said thin, light-transmitting member is secured along the entire periphery thereof to said first surface of said substrate member.

5. The method according to claim 4 further including the step of applying an adhesive to said periphery of said thin, light-transmitting member prior to said positioning thereof over said disconnect switch, said adhesive providing said securement of said thin, light-transmitting member to said first surface of said substrate member.

6. The method according to claim 1 further including the step of depositing a layer of light reflecting material on said first surface of said substrate member prior to said pouring of said resin material.

7. The method according to claim 1 wherein said photoflash lamp is electrically activated and includes a pair of lead-in wires projecting from said glass envelope, said method further including providing a pair of openings within said substrate member and inserting each of said lead-in wires within a respective one of said openings to effect said positioning of said photoflash lamp on said substrate prior to said pouring of said liquid casting resin.

8. The method according to claim 7 wherein said lead-in wires pass through said openings and project externally from said substrate member, each of the externally projecting portions of said lead-in wires being bent back against a second surface of said substrate member.

* * * * *